United States Patent
Jain et al.

(10) Patent No.: US 11,573,999 B2
(45) Date of Patent: Feb. 7, 2023

(54) ACCESSIBLE MULTIMEDIA CONTENT

(71) Applicant: ADOBE INC., San Jose, CA (US)

(72) Inventors: Ajay Jain, Ghaziabad (IN); Anurag Aggarwal, Uttar Pradesh (IN); Sachin Soni, Uttar Pradesh (IN); Sanjeev Tagra, Redmond, WV (US)

(73) Assignee: ADOBE INC., San Jose, CA (US)

( * ) Notice: Subject to any disclaimer, the term of this patent is extended or adjusted under 35 U.S.C. 154(b) by 27 days.

(21) Appl. No.: 16/944,490

(22) Filed: Jul. 31, 2020

(65) Prior Publication Data
US 2022/0035853 A1    Feb. 3, 2022

(51) Int. Cl.
*G06F 16/438*    (2019.01)
*G06F 16/48*    (2019.01)
*G06F 16/435*    (2019.01)
*G06F 16/432*    (2019.01)
*G10L 13/08*    (2013.01)

(52) U.S. Cl.
CPC ........ *G06F 16/4393* (2019.01); *G06F 16/433* (2019.01); *G06F 16/437* (2019.01); *G06F 16/489* (2019.01); *G10L 13/08* (2013.01)

(58) Field of Classification Search
CPC .. G06F 16/4393; G06F 16/489; G06F 16/437; G06F 16/433
USPC ........................................................ 707/736
See application file for complete search history.

(56) References Cited

U.S. PATENT DOCUMENTS

| | | | | |
|---|---|---|---|---|
| 10,645,129 | B2* | 5/2020 | Aggarwal | H04M 3/56 |
| 2009/0316872 | A1* | 12/2009 | Wolf | H04M 3/567 |
| | | | | 379/202.01 |
| 2010/0057928 | A1* | 3/2010 | Kapoor | G06F 16/4387 |
| | | | | 709/231 |
| 2013/0016175 | A1* | 1/2013 | Alberth | H04N 7/15 |
| | | | | 348/E7.083 |
| 2014/0289622 | A1* | 9/2014 | Riggs | G06F 3/01 |
| | | | | 715/716 |
| 2016/0034111 | A1* | 2/2016 | Sahai | G06Q 10/10 |
| | | | | 715/730 |
| 2016/0191971 | A1* | 6/2016 | Benitez | H04N 21/8456 |
| | | | | 725/34 |
| 2017/0235739 | A1* | 8/2017 | Yang | G06F 3/0481 |
| | | | | 715/784 |
| 2018/0253216 | A1* | 9/2018 | Beene | G06F 3/04897 |
| 2019/0166176 | A1* | 5/2019 | Jain | H04L 65/604 |
| 2022/0141552 | A1* | 5/2022 | Tang | G11B 27/036 |
| | | | | 709/231 |

* cited by examiner

*Primary Examiner* — Kimberly L Wilson
(74) *Attorney, Agent, or Firm* — F. Chau & Associates, LLC

(57) ABSTRACT

A method of generating accessible content is described. Embodiments of the method identifies a plurality of channels for a multimedia communication session, generate a master timeline for the communication session, wherein the master timeline comprises a chronological ordering of events from each of the channels, and wherein each of the events is associated with event-specific audio data, and present the multimedia communication session to a user to enable the user to transition among the channels based on the master timeline.

18 Claims, 10 Drawing Sheets

ACCESSIBLE MULTIMEDIA CONTENT

BACKGROUND

The following relates generally to accessible content, and more specifically to generating and providing accessible content related to a multimedia presentation.

Millions of people worldwide are visually impaired. Many visually impaired people use accessibility features provided in software applications. In some cases, regulations encourage or require accessibility features to be provided by software vendors. For example, the American Disability Act (ADA) in the United States and corresponding regulations in other countries provide guidelines on accessibility. Such accessibility features enable physically disabled people to consume a wider variety of content, improve their education options, and achieve their professional goals.

Accordingly, accessibility features offered by software products are becoming increasingly important and popular. However, in many cases, accessible content generated from multimedia presentations does not include all of the content of the original presentation. In some cases, the content includes a main audio channel, but excludes slide content or other multimedia content. Therefore, there is a need in the art for improved systems and methods to generate and present accessible content.

SUMMARY

The present disclosure provides systems and methods for automatically generating accessible content from multiple channels of multimedia content. Embodiments of the present disclosure include generating a timeline of events that occur on different audio channels, and then provide a means for a visually impaired user to switch between audio channels. In some embodiments, a user navigates from a main audio channel to an alternate channel at appropriate times based on audio prompts.

A method, apparatus, and non-transitory computer readable medium for generating accessible content are described. Embodiments of the method, apparatus, and non-transitory computer readable medium identify a plurality of channels for a multimedia communication session, generate a master timeline for the communication session, wherein the master timeline comprises a chronological ordering of events from each of the channels, and wherein each of the events is associated with event-specific audio data, and present the multimedia communication session to a user to enable the user to transition among the channels based on the master timeline.

A method, apparatus, and non-transitory computer readable medium for presenting accessible content are described. Embodiments of the method, apparatus, and non-transitory computer readable medium play a first audio file from a first channel of a multimedia communication session, determine that a second audio file associated with an event from a second channel of the multimedia communication session is available based on a master timeline, wherein the master timeline comprises an ordering of events from the multimedia communication session, provide a channel availability indication to a user based on the determination, receive a channel navigation command from the user based on the channel availability indication, and play the second audio file based on the channel navigation command.

An apparatus for providing accessible content is described, and a method for manufacturing the apparatus. Embodiments of the apparatus include a recording component configured to record a plurality of channels for a multimedia communication session, a conversion component configured to convert non-audio channels of the multimedia communication session into audio files, and a timeline generation component configured to generate a master timeline for the communication session, wherein the master timeline comprises a chronological ordering of events from each of the channels.

DETAILED DESCRIPTION

Figure 1:
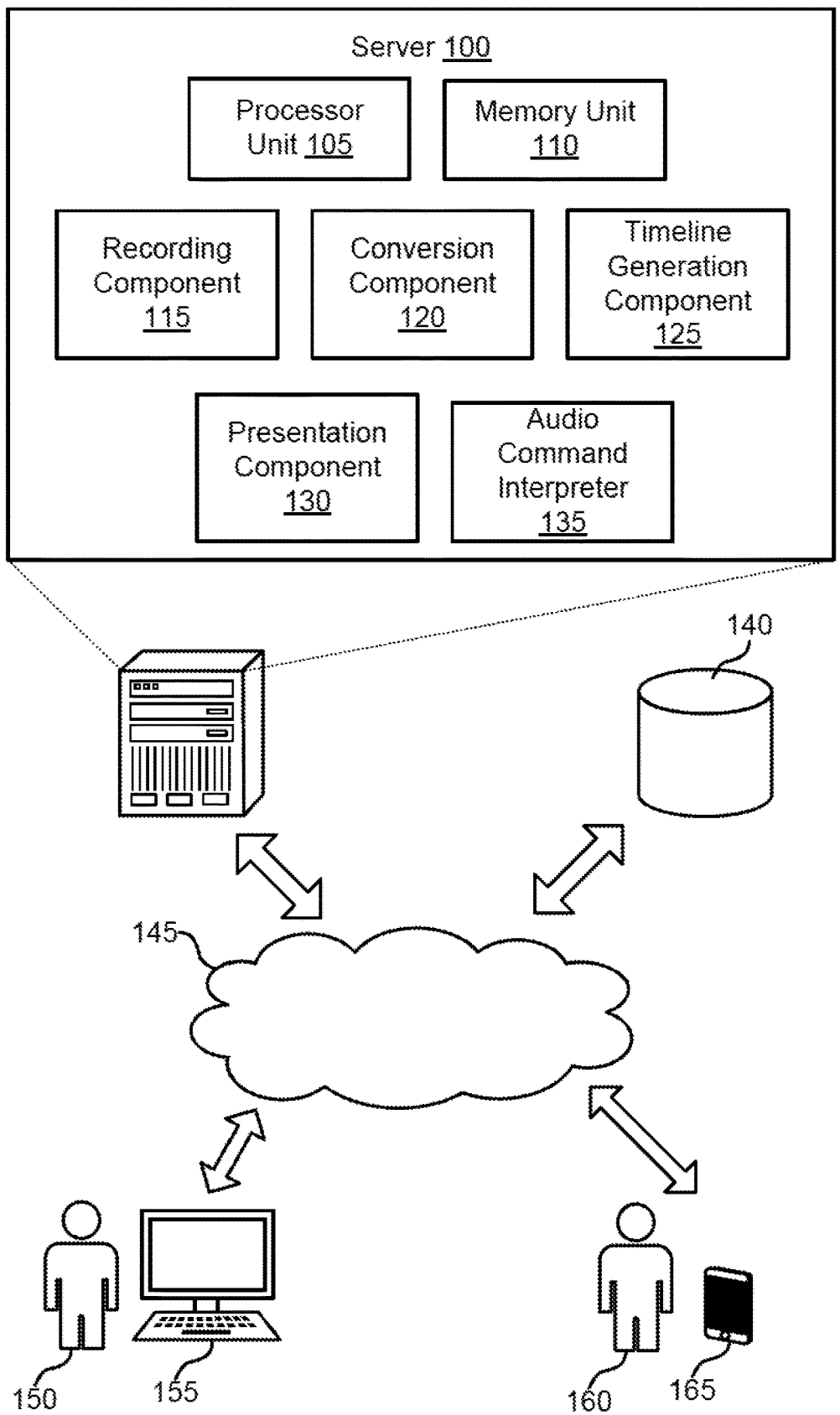
FIG. 1 shows an example of a system for generating accessible multimedia content according to aspects of the present disclosure.

The present disclosure relates to accessible content. More specifically, embodiments of the present disclosure provide systems and methods for generating and presenting an accessible version of multimedia content.

Consumption of multimedia contents has increased dramatically over the recent past; particularly multimedia contents that are accessed online. However, many accessible contents generated for visually impaired users do not include the tools needed for easy access of all features of multimedia presentations. In one example, in a live e-learning session, content is organized into "pods" with each pod performing a specific role (e.g., chat, polls, whiteboard, notes etc.). The live session is recorded by an instructor or administrator and the recording of the session is hosted on a website (e.g., university portal) and made available to the attendees for on-demand consumption.

However, using conventional methods a visually impaired user is not able to switch between various channels to consume content in another channel of the recorded session. For example, in some cases the user is not able to interact with polls, slides, or chat messages. Usually, the user only listens to one single track of the session (e.g., the presenter's vocal audio). Thus, a visually impaired user is unaware of what is happening on other channels, such as slides being shown, chat messages, or polls unless the instructor verbally described the content during the session.

Therefore, the present disclosure provides systems and methods for automatically generating accessible content from multiple channels of multimedia content. Embodiments of the present disclosure generate a timeline of events that occur on different audio channels, and provide a notification (e.g., a chime) for a visually impaired user to switch between audio channels to hear relevant content from different channels (or to listen to multiple channels simultaneously). Thus, a user has the ability to switch back and forth from a main audio channel (e.g., playing the presenter's audio) to an alternate channel (e.g., where polls are conducted) at appropriate times.

For example, metadata about each of the channels including important events that occur on the channels may be combined into the master timeline. Non-audio channels may then be converted into audio channels using, for example, a speech-to-text converter. Then, a navigation component may prompt the user with an option to change from one audio file to another at times associated with events on the master timeline.

The described methods and apparatus of the present disclosure provide higher accessibility of content consumption for visually impaired users such as students, attendees, and participants. The described methods provide enhance accessibility features in media such as online education presentations and webinars, which leads to a better learning experience, more effective collaboration, and improved conferencing for visually impaired users.

The term "channel" refers to a type of information presented in a multimedia presentation. For example, different channels may include a primary audio channel, a background audio channel, a video channel, a polls channel, a whiteboard channel, a chat channel etc.

The term "event" refers to an important occurrence on a channel. For example, when a presenter changes the slide, an event might be indicated in a slides channel. Similarly, when a presenter starts a poll, an event might be recorded in the polls channel. In some cases, the events are associated with an extended period of time (e.g., the period of time that a slide is displayed, or that a poll is available for voting).

The term "master timeline" includes information about the order of events from all of the channels in a multimedia content. For example, the master timeline can indicate the time at which a slide is changed, as well as the time when a poll was started. Thus, a visually impaired user may be presented with audio navigation options for switching channels at key times associated with the different channels.

System Overview

FIG. 1 shows an example of a system for generating accessible multimedia content according to aspects of the present disclosure. The example shown includes server 100, database 140, cloud 145, presenter 150, presentation device 155, user 160 (e.g., a visually impaired user), and user device 165.

In an example, the presenter 150 produces and record a presentation on the presentation device 155. In some cases, the presentation or content is generated by multiple users (e.g., multiple users participating in a meeting). Audio information and other content from the presentation are then transmitted via the cloud 145 to the server 100. The server 100 then generates an accessible version of the presentation, which is stored on the database 140 (which in some cases represents cloud storage, but is not limited thereto). In an example, the cloud 145 includes a multi-layer communications network comprising multiple edge routers and core routers. In another example, the cloud is a local collection of switches in a single physical location.

Once it is generated, the user 160 is able to access the content from the database 140 via the cloud 145 using the user device 165. In some cases, the user 160 accesses different portions or channels of the content using an accessible content navigation system using, for example, voice commands.

In an embodiment, server 100 includes processor unit 105, memory unit 110, recording component 115, conversion component 120, timeline generation component 125, presentation component 130, and audio command interpreter 135. In some cases, certain components of the server 100 are located on either the presentation device 155 (e.g., the recording component 115) or the user device 165 (e.g., the presentation component 130 and the audio command interpreter 135).

According to one embodiments, a processor unit 105 includes an intelligent hardware device (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In one example, the processor is configured to execute computer-readable instructions stored in a memory to perform various functions. In some examples, a processor includes special purpose components for modem processing, baseband processing, digital signal processing, or transmission processing.

A memory unit 110 stores information for various programs and applications on a computing device. In one example, the storage includes data for running an operating system. In one example, the memory includes both volatile memory and non-volatile memory. Volatile memory includes random access memory (RAM), and non-volatile memory includes read-only memory (ROM), flash memory, electrically erasable programmable read-only memory (EEPROM), digital tape, a hard disk drive (HDD), and a solid state drive (SSD). Memory includes any combination of readable and/or writable volatile memories and/or non-volatile memories, along with other possible storage devices.

Recording component 115 records or identifies a set of channels for a multimedia communication session. In some embodiments, recording component 115 also identifies events from each of the set of channels, and generate event data for each of the events, where the event data includes the event-specific audio data and a start time of the event. In some examples, the channels include at least two of a foreground audio channel, a background audio channel, a slide presentation channel, a chat channel, and a polls channel. In some examples, the channels include at least two simultaneous channels. In some examples, the channels include at least one audio channel and at least one non-audio channel.

In one example, an online e-learning session is held on a presentation application (e.g., Adobe® Connect). According to an exemplary embodiment of the present disclosure, each component of the online learning session is mapped into individual channels. In one example, a first channel is a presentation slides channel where the presenter is presenting, a second channel is a speaker's audio channel representing the verbal audio presenter is talking in the session, a third channel is a chat channel that carries the chat content being added by the attendees, and a fourth channel is a polls channel that carries the polls content coming in from the learning session. The number of channels is not limited to four, but can be any number. Furthermore, the functions or roles associated with each individual channel is not limited to the functions mentioned above.

Each of the channels includes one or more events happening at various time throughout the session. In some cases, activities occur in parallel in all these channels on a linear timeline. In one example, the presentation slides channel occur and continue in parallel with the chat pod channel. In another example, the chat pod channel occur and continue in parallel with the polls channel. In some cases, a starting time of the first channel is not the same as a starting time of the second channel.

Conversion component 120 converts visual data from one or more of the channels to the event-specific audio data. In one embodiment, conversion component 120 is configured to convert non-audio channels of the multimedia communication session into audio files. In some examples, the conversion component 120 includes a text-to-speech component. In some other examples, the conversion component 120 includes an image-to-speech component.

According to an exemplary embodiment of the present disclosure, events on each of the individual channels are captured in a corresponding audio file (e.g., flash video file (FLV)) with their corresponding timestamps. In another embodiment of the present disclosure, each event in each of the channels generates its own translated audio file (e.g., MP3).

Thus, in one example, polls are conducted during an online learning session. However, if the polls is based in text, or displayed visually, a visually impaired user 160 will not experience the full content of the polls. Thus, according to embodiments of the present disclosure, a polls channel is converted into audio files and the system plays the audio files based on the channel navigation command from the user 160. The conversion component 120 includes a text-to-speech component and converts, for example, title and options of a poll into an audio file. The user 160 has the option choose to listen to the audio file having the content of the poll such as the title and options.

Timeline generation component 125 generates a master timeline for the communication session, where the master timeline includes a chronological ordering of events from each of the channels, and where each of the events is associated with event-specific audio data. In some embodiments, timeline generation component 125 also generates channel metadata for each of the channels based on the event data, where the master timeline is generated based on the channel metadata. In one example, the channel metadata includes information about the channel itself such as start time, stop time, channel type, channel name, priority information, etc.

According to an exemplary embodiment of the present disclosure, the audio files are combined together to form a master index file. The master index file includes the master timeline, and events on each channel file are mapped to the master timeline. Each individual channel includes a plurality of events happening in that individual channel which occur throughout the learning session. In one example, the chat channel has a total of N events that have happened during the learning session. In this case, the chat channel has events labeled 1 to N and each event has its own occurrence at a specific time in the session as well as the duration associated with the event. In one example, a first event (e.g., event 1) in the chat channel starts from T1 and continues till T3.

In one example, the data structure for an event in a specific channel includes event ID, title of the event, start time, duration of the event, event data, and event audio translation. In one example, the event data furthers include audio, video, and text data. In an embodiment, the event audio translation is in the format of an audio file (e.g., MP3 file). In one example, the data structure for the event is referred to as struct event.

In some examples, each event in the plurality of channels generates its own translated audio file (e.g., MP3) which has all the content that has happened while the event is on in an audible format. In one example, each channel has a corresponding extensible markup language (e.g., XML) metadata file. In one example, the metadata file is given a name such as "Channel_type_of_channel_Metadata.xml" and includes a collection of all audio files generated from each of the events that has happened in the channel along with the time value when the event has happened. In one example, the chat channel has its corresponding metadata file as "Channel_Chat_Metadata.xml".

In some examples, the metadata file includes a list of all available translated audio files of all the events that has happened in the chat channel along with each audio file mapped to the time on which it has happened on the master timeline. These audio files are mapped to their corresponding times on the master timeline. Similarly, the polls channel has its corresponding metadata file as "Channel_Polls_Metadata.xml". The presentation slides channel has its corresponding metadata file as "Channel_PresentationSlides_Metadata.xml". The metadata file includes a list of all available audible audio MP3 files of all the presentation slides that have been presented in the session in the presentation slides channel.

Figure 3:
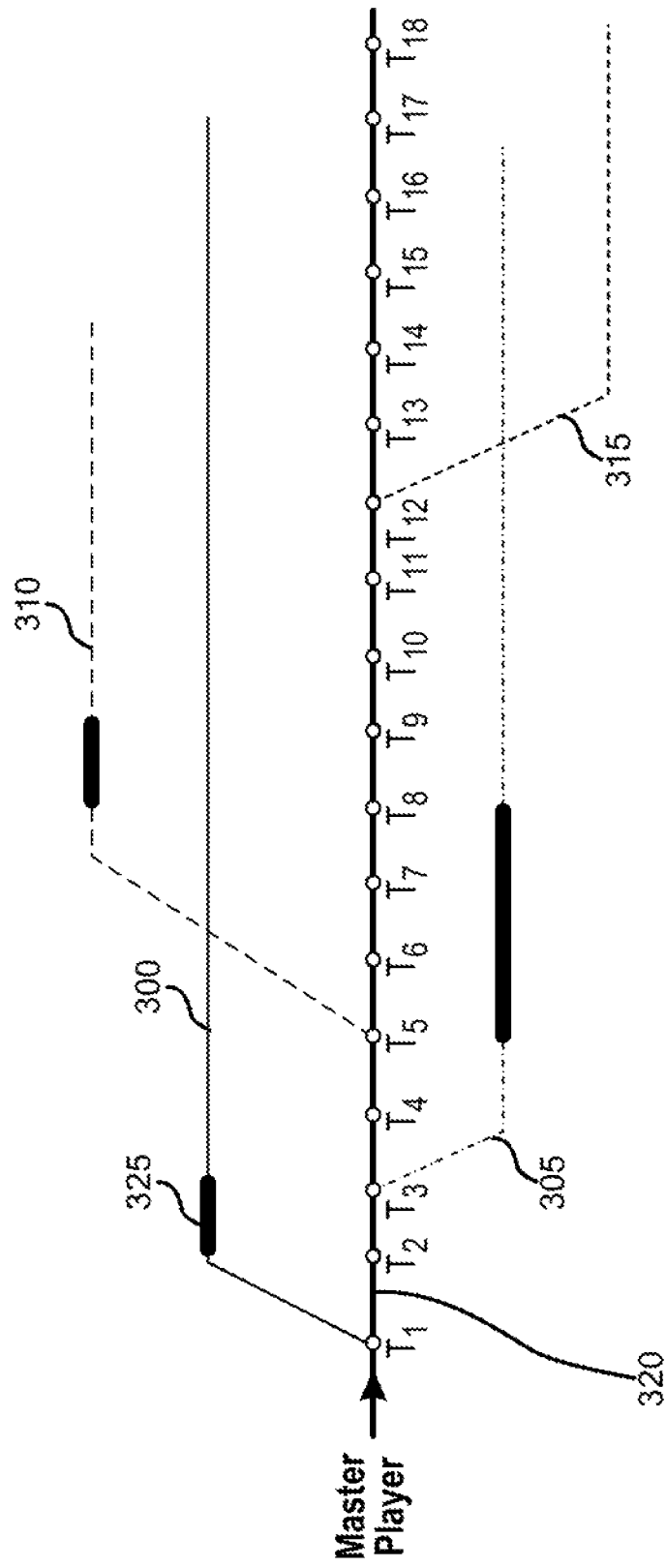
FIG. 3 shows an example of a presentation timeline according to aspects of the present disclosure.

According to one example, a structure of an e-learning session includes the e-learning session starting from a time (e.g., T1 as shown in FIG. 3), where the presenter's audio also starts at T1, with presentation slides coming up at a later time (e.g., T3), chat channel starting later (e.g., at T5), and a polls channel starting at an even later time (e.g., at T12). In one example, files of the presenter's verbal audio, presentation slides, chat, polls are stitched together and can be played by a custom player which is then played in the master player.

Presentation component 130 presents the multimedia communication session to a user 160 in a way that enables the user 160 to transition among the channels based on the master timeline. In one example, presentation component 130 plays a first audio file associated with a default channel of the set of channels. Then, presentation component 130 identifies an event from a secondary channel from the set of channels based on the master timeline, where the event is associated with a current time of the first audio file, and provide a channel availability indication to the user 160 indicating that the user 160 also plays a second audio file associated with the event.

In some examples, presentation component 130 determines that a second audio file associated with an event from a second channel of the multimedia communication session is available based on a master timeline, where the master timeline includes an ordering of events from the multimedia communication session. In some cases, presentation component 130 plays the second audio file based on the channel navigation command. In some examples, the channel availability indication includes a verbal description of available navigation options including the second channel.

In some examples, presentation component 130 provides an event completion indication to the user 160 after playing the second audio file. Presentation component 130 then resumes playing the first audio file based on the resume default command. In some examples, presentation component 130 also determines a time for resuming the first audio file based on the user 160 configuration, where the time for resuming the first audio file includes a stopping time of the first audio file or a time associated with an end of the second audio file. In some cases, presentation component 130 determines that the second audio file includes a background audio file, where the second audio file is played simultaneously with the first audio file.

Thus, in an exemplary embodiment of the present invention, an audio experience is provided such that the user 160 can consume content across a plurality of channels. The user 160 consumes audio from the presenter 150, and switches between channels to consume translated audio from the visual sections (e.g., slides or polls). In some examples, the described audio consumption experience includes a custom player with which the user 160 interacts via an audio command interpreter 135. In one example, a visually impaired (e.g., blind) user seamlessly switches between various channels as well as their associated events when playing back the recorded media of a learning session using personal commands (e.g., voice).

Audio command interpreter 135 receives and interprets channel navigation commands from the user 160. In one example, audio command interpreter 135 receives a channel navigation command from the user 160 based on the channel availability indication. In some examples, the channel navigation command includes a verbal command from the user 160 indicating the second channel (i.e., that the user wants to switch channels). In some examples, audio command interpreter 135 receives a resume default command from the user 160. In some examples, audio command interpreter 135 is configured to receive audio inputs from the user 160 and identify navigation commands based on the audio inputs.

According to some embodiments of the present disclosure, the user device 165 includes the audio command interpreter 135 which listens to the user's commands (e.g., verbal commands) and alters the playback behavior based on these commands. In some cases, there is a default channel which can be decided by the author of the recording (in some cases, the author is the presenter 150).

In one example, a playback scenario starts by running through the timeline of the default channel, and involves audio notifications to the user 160 when certain scenarios occur. The scenarios include when a new channel starts, when a presenter 150 starts speaking, or when the presenter 150 shares presentation slides. The scenarios also include when an event is encountered on a running channel, for example, a question is asked by a participant, a chat is sent, a replay is posted, or when a channel ends, i.e., the presenter 150 stops speaking, a poll ends, etc.

According to an exemplary embodiment of the present disclosure, a user 160 chooses to reply to the notifications using predefined commands. In one example, the predefined commands include switching the channel, selecting a new channel as the default, muting a channel, returning to a default channel, not switching the channel but continue to hear notifications from the other channel, or playing both the channels simultaneously (i.e., if a channel has background music).

According to one example, when a user 160 starts listening to the recorded media file through the master player, as soon as the user reaches a particular point in time, a corresponding first event happens on the presenter's audio channel. The presentation system determines what channel this event is associated with and identifies a metadata file of the channel to locate the corresponding audio file with reference to the first event that has happened in the presenter's audio channel. The master player reaches to the corresponding audio file and play back the audio file to the user 160. Then, the user 160 starts listening to the presenter's audio in the session.

According to an embodiment of the present disclosure, the system includes a navigation module which provides an audio announcement to the user 160 the occurrence of other events on other channels. The navigation module asks for the user's choice and permission if the user 160 needs to switch to a different channel. In some embodiments, the user 160 is provided voice-based number selection (e.g., the user 160 says "one" vocally to switch to the new presentation slides channel event, the user says "resume" to continue listening to the present channel, the user says "pause" to pause listening to a channel). Depending on the selection made by the user 160, an audio file of the selected channel event is streamed to the user 160 and the existing audio file from the previous channel pauses. At any time, the user 160 has the option to switch back to any of the events associated with other channels through voice-based selections.

Thus, according to some embodiments of the present disclosure, whenever multiple events occur across different channels, the user 160 is provided a notification that an event has happened on another channel. In some examples, the user 160 is provided an option to switch to the other channel. This results in a seamless switching from one channel to another channel for the user 160, who can listen to the corresponding events audio file comfortably and conveniently. Thus, the user 160 is able to consume the entire content of the recorded media and can have a better user experience. Accordingly, the user 160 is able to consume a recording from an e-learning session in a more complete manner.

According to an embodiment of the present disclosure, the presentation component 130 and the audio command interpreter 135 are configured and implemented on a user device 165. In addition, the recording component 115, the conversion component 120, and the timeline generation component 125 are configured and implemented on the presentation device 155.

Figure 2:
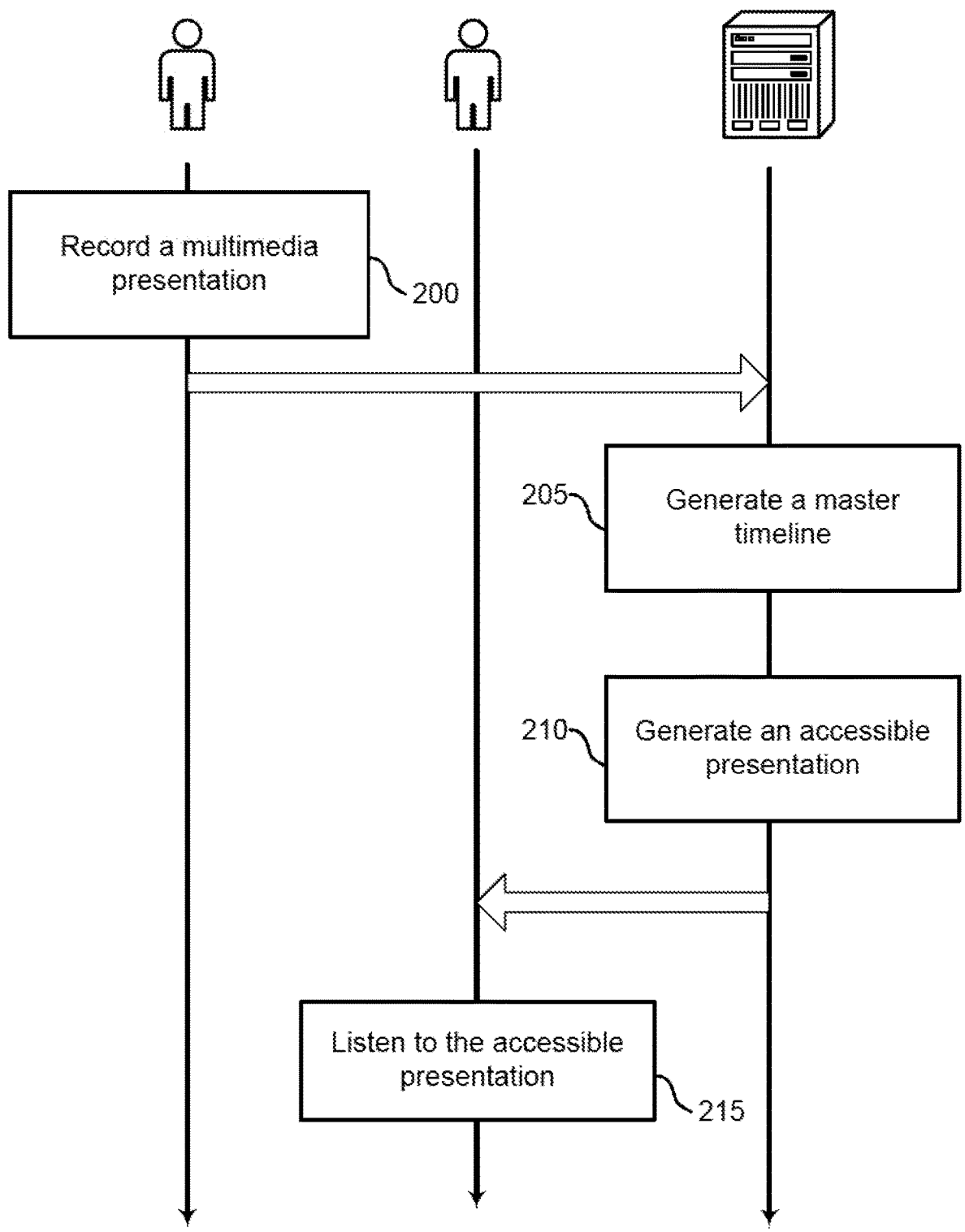
FIG. 2 shows an example of a process for generating accessible multimedia content according to aspects of the present disclosure.

FIG. 2 shows an example of a process for generating accessible multimedia content according to aspects of the present disclosure. In some examples, these operations are performed by a system including a processor executing a set of codes to control functional elements of an apparatus. Additionally or alternatively, the processes are performed using special-purpose hardware. Generally, these operations are performed according to the methods and processes described in accordance with aspects of the present disclosure. In one example, the operations are composed of various substeps, or are performed in conjunction with other operations described herein.

At operation 200, the presenter 150 records a multimedia presentation on the presentation device 155. In one example, the multimedia presentation includes a primary audio channel, background music, video clips, slides, a chat session, or polls.

According to an embodiment of the present disclosure, the recording component 115 of the server 100 identifies the set of channels associated with the multimedia communication session. In one example, the recording component 115 also identifies the events from each of the set of channels.

At operation 205, the system generates a master timeline. Referring to FIG. 1, the timeline generation component 125 of the server 100 generates a master timeline for the communication session, where the master timeline includes a chronological ordering of events from each of the channels, and where each of the events is associated with event-specific audio data. Timeline generation component 125 also generates channel metadata for each of the channels based on the event data, where the master timeline is generated based on the channel metadata. In some examples, the event data further includes at least one of an event ID, an event name or title, an event duration, an event audio file, and a start time.

According to an exemplary embodiment of the present disclosure, the audio files are combined together to form a master index file. The master index file includes a master timeline, and events on each channel file is mapped to the master timeline.

At operation 210, the system generates an accessible presentation based on the master timeline. The accessible presentation may include multiple audio files from different channels of the multimedia presentation, along with events on the master timeline that provide opportunities for a user to transition among the audio files.

Presentation component 130 then presents the multimedia communication session to a user 160 in a way that enables the user 160 to transition among the channels based on the master timeline. In one embodiment, the presentation component 130 plays a primary audio file, and then provides audible prompts for navigating among audio files associated with the different channels at times associated with events on the master timeline.

For example, presentation component 130 begins by playing a first audio file associated with a default channel of the set of channels. Then, presentation component 130 also identifies an event from a secondary channel from the set of channels based on the master timeline, where the event is associated with a current time of the first audio file. At that time, a channel availability indication is provided to the user 160. If the user elects to change the channel, the presentation component 130 also plays a second audio file associated with the event.

At operation 215, the user 160 listens to the accessible presentation from the user device 165. According to an embodiment of the present disclosure, a player application on the user device 165 has an audio command interpreter 135 which listens to a user's commands (e.g., verbal commands) and alters the playback behavior based on these commands. In some cases, there is a default channel which can be decided by the author of the recording (in some cases, the author is the presenter 150). In one example, a playback scenario starts by running through the timeline of the default channel, and involves audio notifications to the user 160 when certain scenarios occur.

In an exemplary embodiment of the present invention, an audio experience is provided such that a user 160 can consume content across a plurality of channels. The user 160 consumes audio from the presenter 150, as well as switch between channels to consume translated audio from the visual sections (e.g., slides or polls). The audio consumption experience includes a custom player with which the user 160 interacts via the audio command interpreter 135. Thus, whenever multiple events occur across different channels, the user 160 is provided a notification that an event has happened on another channel. The user 160 is provided an option to switch to the other channel. This results in a seamless switching from one channel to another channel for the user 160, who can listen to the corresponding events audio file comfortably and conveniently.

Accessible Content

FIG. 3 shows an example of a presentation timeline according to aspects of the present disclosure. The presentation timeline represents the correlation of multiple content channels that are combined to create accessible content from a multimedia presentation.

The example shown includes first channel 300 (e.g., a primary audio channel), second channel 305 (e.g., a slide deck), third channel 310 (a chat session), and fourth channel 315 (e.g., a poll), which are arranged on a master timeline 320. Thus, according to an embodiment of the present disclosure, each component of the online learning session is mapped into individual channels. The number of channels is not limited to four, but can be any number. Furthermore, the functions or roles associated with each individual channel is not limited to the functions mentioned above.

First channel 300 is an example of, or includes aspects of, the corresponding element or elements described with reference to FIGS. 4 and 5. In one example, the first channel 300 is a speaker's audio channel representing the verbal audio presenter is talking in the session. Second channel 305 is an example of, or includes aspects of, the corresponding element or elements described with reference to FIGS. 4 and 5. In one example, the second channel 305 is a presentation slides channel where the presenter is presenting.

Third channel 310 is an example of, or includes aspects of, the corresponding element or elements described with reference to FIG. 4. In one example, the third channel 310 is a chat pod channel that carries the chat content being added by the attendees. Fourth channel 315 is an example of, or includes aspects of, the corresponding element or elements described with reference to FIG. 4. In one example, the fourth channel 315 is a polls channel that carries the polls content coming in from the learning session.

Master timeline 320 includes events 325, which occur at a particular time, and is associated with a channel. Thus, each of the channels is associated with a plurality of events 325 happening at various times throughout the session. In some cases, each of the events 325 is extended in time and has a different duration. In one embodiment of the present disclosure, there is activities going on in parallel in all these channels (e.g., 300, 305, 310, 315) on a linear timeline. In one example, the presentation slides channel occurs and continue in parallel with the chat pod channel. In another example, chat channel occurs and continue in parallel with the polls channel. In some cases, a starting time of the first channel 300 may not be the same as a starting time of the second channel 305. Such a pattern is true for the other channels.

According to an example, a time duration of the first channel 300 overlaps a time duration of the second channel 305. Such a pattern is true for the other channels. In one example, the third channel 310 (e.g., chat channel) has a total of N events that have happened during the learning session. Accordingly, the third channel 310 has events labeled 1 to N and each event has its own occurrence at a specific time in the session.

In some cases, events also have a duration. In one example, a first event starts from T2 and continues till T3. A second event starts from T5 and continues till T8. In some cases, the starting time of an event is not earlier than a starting time of the master timeline 320, and an end time of a last event on any of the channels is not later than an end time of the master timeline 320.

Figure 4:
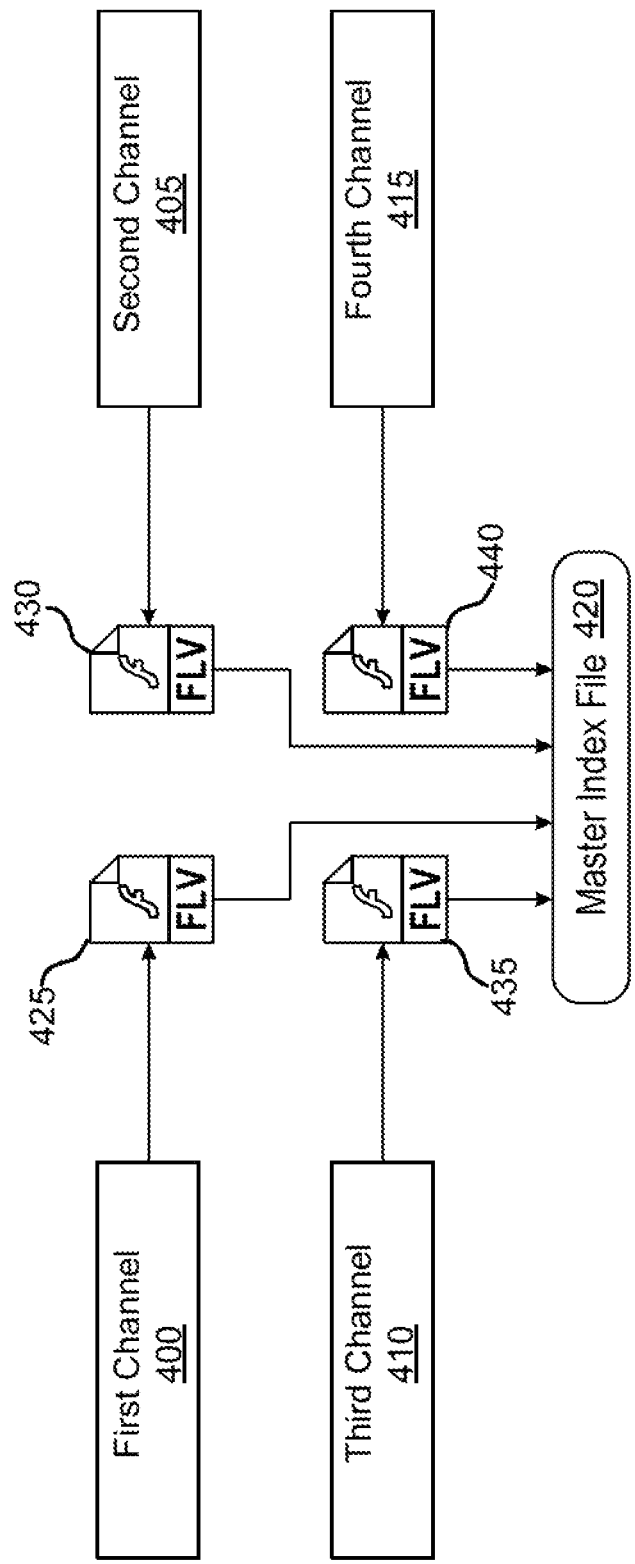
FIG. 4 shows an example of a master index file according to aspects of the present disclosure.

FIG. 4 shows an example of a master index file 420 according to aspects of the present disclosure. The master index file 420 includes audio files associated with various channels. The example shown includes first channel 400, second channel 405, third channel 410, fourth channel 415, and master index file 420.

According to an embodiment of the present disclosure, each component of the online learning session is mapped into individual channels. The number of channels is not limited to four, but can be any number. Furthermore, the functions or roles associated with each individual channel is not limited to the functions mentioned above. Accordingly, the number of channel audio files is not limited to four, but can be any number depending on the number of channels.

As illustrated in FIG. 1, the conversion component 120 converts visual data from one or more of the channels to the event-specific audio data. In some examples, the conversion of the visual data includes a text-to-speech conversion. The conversion component 120 is configured to convert non-audio channels of the multimedia communication session into audio files. In some examples, the conversion component 120 includes an image-to-speech component.

According to an exemplary embodiment of the present disclosure, events on each of the individual channels (e.g., 400, 405, 410, 415) is captured in a corresponding audio file (e.g., FLV) with their corresponding timestamps. In another embodiment of the present disclosure, each event in a channel generates its own translated audio file (e.g., MP3).

Hence, events on the first channel 400, second channel 405, third channel 410, fourth channel 415, is converted to a first channel audio file 425, a second channel audio file 430, a third channel audio file 435, and a fourth channel audio file 440, respectively.

First channel 400, second channel and second channel 405 is examples of, or includes aspects of, the corresponding elements described with reference to FIGS. 3 and 5. In one example, the first channel 400 is a speaker's audio channel representing the verbal audio presenter is talking in the session. Similarly, the second channel 405 is a presentation slides channel where the presenter is presenting.

Third channel 410 is an example of, or includes aspects of, the corresponding element described with reference to FIG. 3. In one example, the third channel 410 is a chat pod channel that carries the chat content being added by the attendees. Fourth channel 415 is an example of, or includes aspects of, the corresponding element or elements described with reference to FIG. 3. In one example, the fourth channel 415 is a polls channel that carries the polls content coming in from the learning session.

Master index file 420 includes the first channel audio file 425, the second channel audio file 430, the third channel audio file 435, and the fourth channel audio file 440. Each of the channels includes a plurality of events 325 happening at various time throughout the session. In one example, the chat channel has a total of N events that have happened during the learning session. Accordingly, the chat channel has events labeled 1 to N and each event has its own occurrence at a specific time in the session as well as the duration associated with the event. In one example, a first event (e.g., event 1) in the chat channel starts from T1 and continues till T3.

Events on each of the individual channels is captured in a corresponding audio file (e.g., FLV) with their corresponding timestamps. These channel audio files 425, 430, 435, 440 are combined together to form a master index file 420. The master index file 420 includes a master timeline 320, and events 325 on each channel file is mapped to the master timeline 320.

Figure 5:
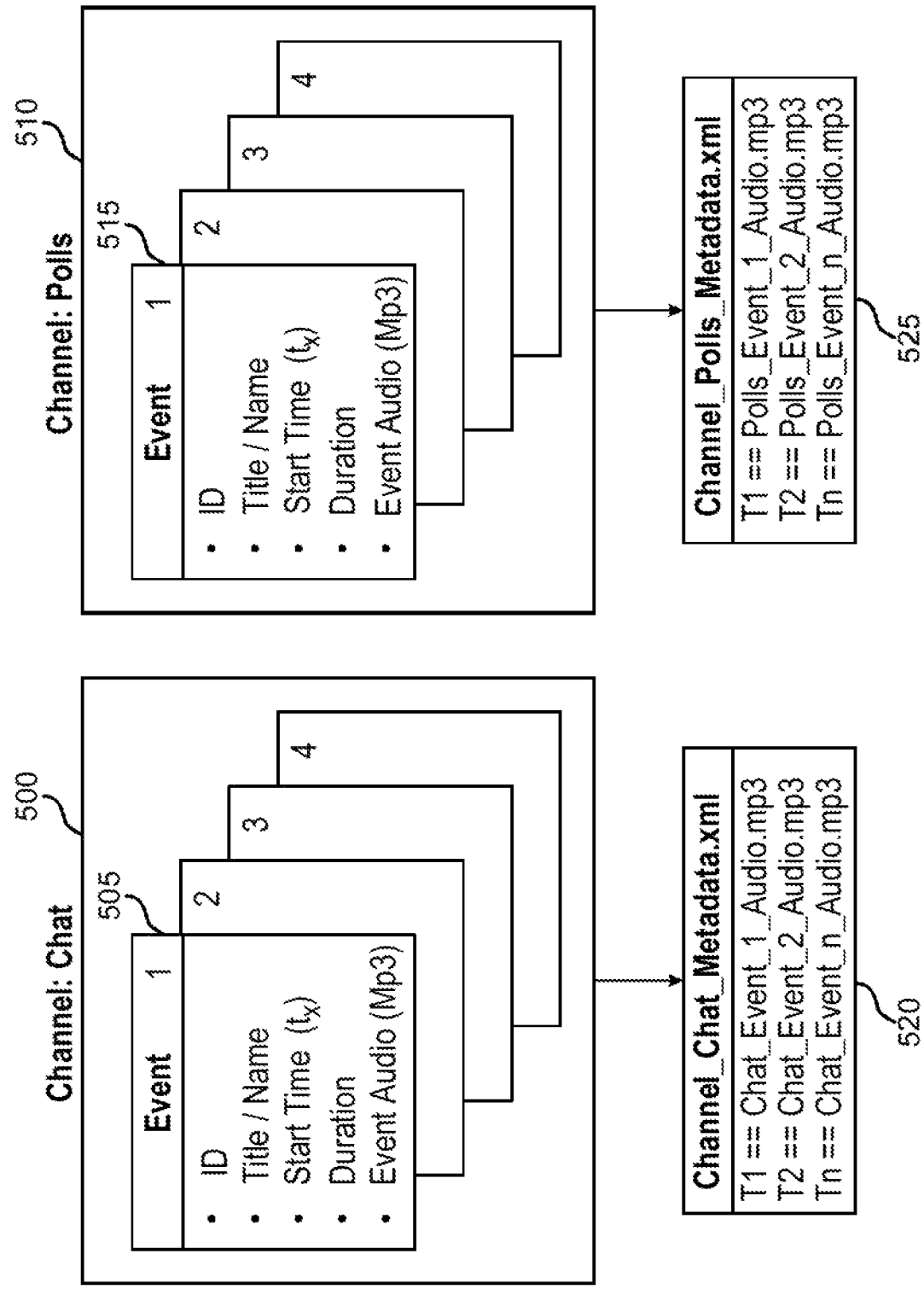
FIG. 5 shows an example of channel metadata according to aspects of the present disclosure.

FIG. 5 shows an example of channel metadata according to aspects of the present disclosure. The channel metadata includes information that enables the creation of a master timeline, and assists in navigation between audio channels. The example shown includes first channel 500, second channel 510, first channel metadata 520, and second channel metadata 525.

According to an embodiment of the present disclosure, each component of the online learning session is mapped into individual channels (e.g., 500, 510). FIG. 5 shows an example of channel metadata having two channels. However, the number of channels is not limited to two, but can be any number. Furthermore, the functions or roles associated with each individual channel is not limited to the functions mentioned in FIGS. 3 and 4. Accordingly, the number of channel metadata is not limited to two, but can be any number depending on the number of channels.

First channel 500 is an example of, or includes aspects of, the corresponding element or elements described with reference to FIGS. 3 and 4. First channel 500 includes first event data 505. Second channel 510 is an example of, or includes aspects of, the corresponding element or elements described with reference to FIGS. 3 and 4. Second channel 510 includes second event data 515.

According to an exemplary embodiment of the present disclosure, each individual channel includes a plurality of events 325 happening in that individual channel which occur throughout the session. The data structure for an event in a specific channel includes event ID, title of the event, start time, duration of the event, event data, and event audio translation. The event data further includes audio, video, and text data. The event audio translation is in the format of an audio file (e.g., MP3 file). In one example, the data structure for the event is be referred to as struct event.

According to an exemplary embodiment of the present disclosure, each event in a channel generates its own translated audio file (e.g., MP3). The audio file has all the content that has happened while the event is on in an audible format. Each channel has a corresponding extensible markup language (e.g., XML) metadata file. The metadata file is given a name such as "Channel_type_of_channel_Metadata.xml" and includes a collection of all audio files generated from each of the events that has happened in the channel along with the time value when the event has happened. In one example, the first channel 500 (e.g., chat channel) has its corresponding first channel metadata 520. The metadata file is named as "Channel_Chat_Metadata.xml". The first channel metadata 520 includes a list of all available translated audio files of all the events that has happened in the first channel 500 along with each audio file mapped to the time on which it has happened on the overall timeline (e.g., the master timeline 320 as illustrated in FIG. 3).

These audio files is mapped to their corresponding times on a timeline. In one example, a first event of the first channel 500 occurs at T1. In some cases, language such as "T1==Chat_Event_1_Audio.mp3" is noted in the "Channel_ Chat_Metadata.xml" metadata file. In addition, a second event of the first channel 500 occurs at T2, therefore, language such as "T2==Chat_Event_2_Audio.mp3" is noted somewhere in the "Channel_Chat_Metadata.xml" metadata file. Further, a n-th event of the first channel 500 occurs at Tn, therefore, language such as "Tn==Chat_Event_n_Audio.mp3" is noted somewhere in the "Channel_Chat_Metadata.xml" metadata file.

Similarly, the second channel 510 (e.g., polls channel) has its corresponding second channel metadata 525. The metadata file is named as "Channel_Polls_Metadata.xml". The second channel metadata 525 includes a list of all available audible audio MP3 files of all the polls that have been conducted in the session in the second channel 510. In one example, language such as "T1==Polls_Event_1_Audio.mp3", "T2 Polls_Event_2_Audio.mp3", and "Tn==Polls_Event_n_Audio.mp3" is noted somewhere in the "Channel_Polls_Metadata.xml" metadata file.

According to one example, a structure of an e-learning session includes the e-learning session starting from T1, presenter's audio starting at T1, presentation slides coming up from T3, chat channel starting at T5 while polls channel starting or conducted at T12. All FLV files of presenter's verbal audio, presentation slides, chat, polls is stitched together and can be played by a custom player which is then played in the master player.

Content Generation

Figure 6:
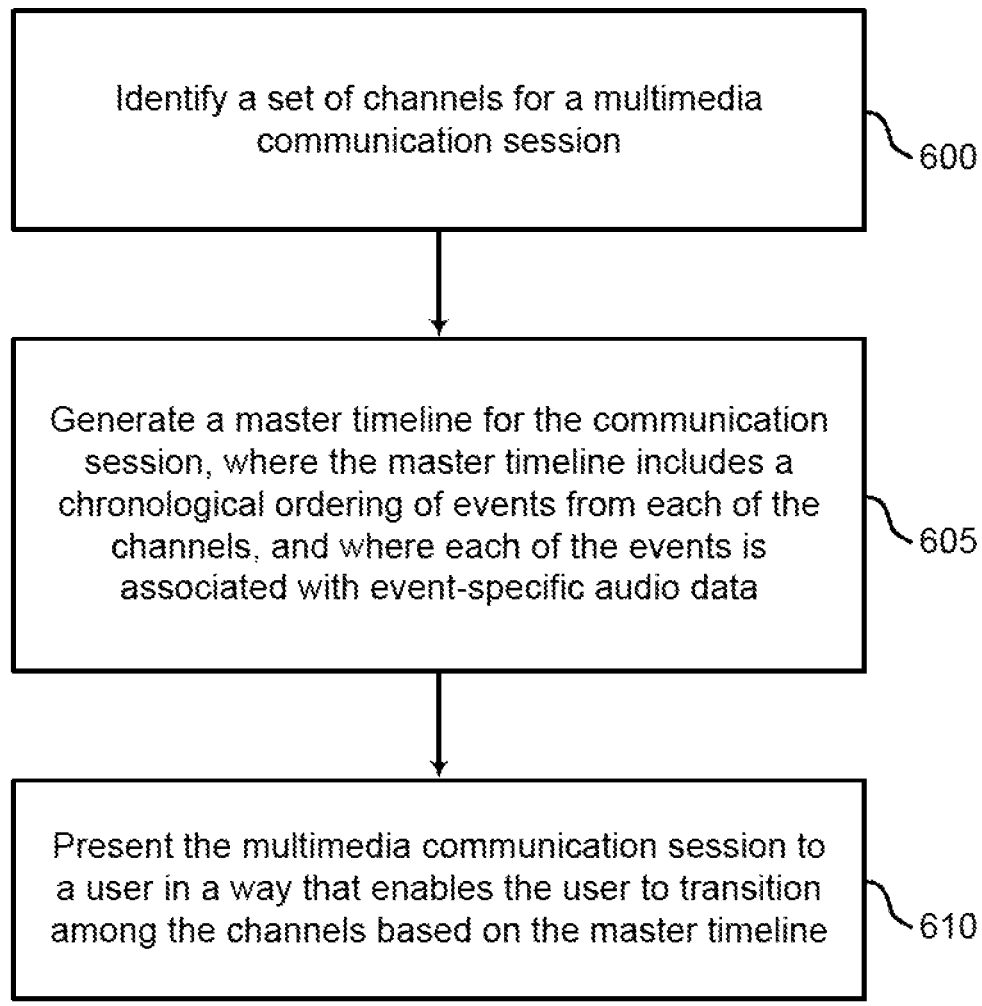
FIG. 6 shows an example of a process for generating accessible content according to aspects of the present disclosure.

FIG. 6 shows an example of a process for generating accessible content according to aspects of the present disclosure. In some examples, these operations are performed by a system including a processor executing a set of codes to control functional elements of an apparatus. Additionally or alternatively, the processes are performed using special-purpose hardware. Generally, these operations are performed according to the methods and processes described in accordance with aspects of the present disclosure. In one example, the operations is composed of various substeps, or is performed in conjunction with other operations described herein.

At operation 600, the system identifies a set of channels for a multimedia communication session. In some cases, the operations of this step refer to, or are performed by, a recording component as described with reference to FIG. 1.

According to an exemplary embodiment of the present disclosure, each component of an online learning session is mapped into individual channels. In one example, a first channel is a speaker's audio channel representing the verbal audio presenter is talking in the session. A second channel is a presentation slides channel where the presenter is presenting. A third channel is a chat channel that carries the chat content being added by the attendees. A fourth channel is a polls channel that carries the polls content coming in from the learning session.

At operation 605, the system generates a master timeline for the communication session, where the master timeline includes a chronological ordering of events from each of the channels, and where each of the events is associated with event-specific audio data. In some cases, the operations of this step refer to, or are performed by, a timeline generation component as described with reference to FIG. 1.

According to an embodiment of the present disclosure, each of the channels carries a plurality of events happening at various time throughout the session. Each of the channels carries a plurality of events happening at various time throughout the session. In one example, the chat channel has a total of N events that have happened during the learning session. Accordingly, the chat channel has events labeled 1 to N and each event has its own occurrence at a specific time in the session as well as the duration associated with the event. In one example, a first event (e.g., event 1) in the chat channel starts from T1 and continue till T3. A starting time of a second event (e.g., event 2) is earlier than a starting time of the first event.

Events on each of the individual channels is captured in a corresponding audio file (e.g., FLV) with their corresponding timestamps. These audio files are combined together to form a master index file. The master index file includes a master timeline, and events on each channel file is mapped to the master timeline. Each individual channel includes a plurality of events happening in that individual channel which occur throughout the learning session.

According to an embodiment of the present disclosure, the data structure for an event in a specific channel includes event ID, title of the event, start time, duration of the event, event data, and event audio translation. In one example, the event data further includes audio, video, and text data. The event audio translation is in the format of an audio file (e.g., MP3 file).

At operation 610, the system presents the multimedia communication session to a user to enable the user to transition among the channels based on the master timeline. In some cases, the operations of this step refer to, or are performed by, a presentation component as described with reference to FIG. 1.

In an embodiment of the present invention, an audio experience is provided such that a user 160 can consume content across a plurality of channels (e.g., 400, 405, 410, 415 as illustrated in FIG. 4). The user 160 consumes audio from the presenter 150, as well as switch between channels to consume translated audio from the visual sections (e.g., slides or polls).

According to an exemplary embodiment of the present disclosure, the system includes a navigation module, which provides an audio announcement informing the user 160 about the occurrence of other events on other channels. The navigation module asks for the user's choice and permission if the user 160 needs to switch to a different channel. In some embodiments, the user 160 is provided voice-based number selection (e.g., the user 160 says "1" vocally to switch to the new presentation slides channel event, the user says "resume" to continue listening to the present channel). Depending on the selection made by the user 160, an audio file of the selected channel event is streamed to the user 160 and the existing audio file from the previous channel pauses. At any time, the user 160 has the option to choose to switch back to any of the events associated with other channels through voice-based selections.

Figure 7:
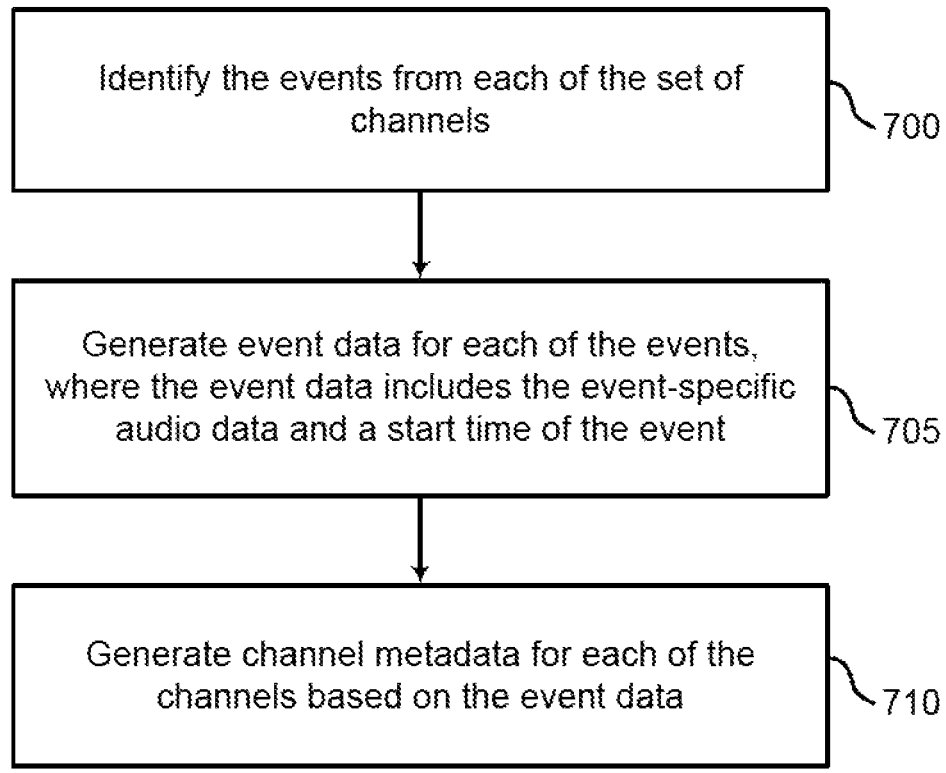
FIG. 7 shows an example of a process for generating channel metadata according to aspects of the present disclosure.

FIG. 7 shows an example of a process for generating channel metadata according to aspects of the present disclosure. In some examples, these operations are performed by a system including a processor executing a set of codes to control functional elements of an apparatus. Additionally or alternatively, the processes are performed using special-purpose hardware. Generally, these operations are performed according to the methods and processes described in accordance with aspects of the present disclosure. In one example, the operations is composed of various substeps, or is performed in conjunction with other operations described herein.

At operation 700, the system identifies the events from each of the set of channels. In some cases, the operations of this step refer to, or are performed by, a recording component as described with reference to FIG. 1.

According to an embodiment of the present disclosure, the recording component 115 identifies a set of channels for a multimedia communication session. The recording component 115 also identifies the events from each of the set of channels.

At operation 705, the system generates event data for each of the events, where the event data includes the event-specific audio data and a start time of the event. In some cases, the operations of this step refer to, or are performed by, a recording component as described with reference to FIG. 1.

According to an embodiment of the present disclosure, the recording component 115 generates event data for each of the events, where the event data includes the event-specific audio data and a start time of the event.

In addition, timeline generation component 125 generates a master timeline for the communication session, where the master timeline includes a chronological ordering of events from each of the channels, and where each of the events is associated with event-specific audio data. In some examples, the event data further includes at least one of an event ID, an event name or title, an event duration, an event audio file, and a start time.

According to an embodiment of the present disclosure, the data structure for an event in a specific channel includes event ID, title of the event, start time, duration of the event, event data, and event audio translation. In some cases, the event data includes audio, video, and text data. The event audio translation is in the format of an audio file (e.g., MP3 file).

At operation 710, the system generates channel metadata for each of the channels based on the event data. In some cases, the operations of this step refer to, or are performed by, a timeline generation component as described with reference to FIG. 1.

According to an embodiment of the present disclosure, the timeline generation component 125 generates channel metadata for each of the channels based on the event data, where the master timeline 320 is generated based on the channel metadata.

According to an exemplary embodiment of the present disclosure, the audio files are combined together to form a master index file 420. The master index file 420 includes a master timeline 320, and events on each channel file is mapped to the master timeline 320. Each individual channel includes a plurality of events happening in that individual channel which occur throughout the learning session.

According to an embodiment of the present disclosure, each channel has a corresponding extensible markup language (e.g., XML) metadata file. The metadata file is given a name such as "Channel_type_of_channel_Metadata.xml," and includes a collection of all audio files generated from each of the events that has happened in the channel along with the time value when the event has happened. In one example, the chat channel has its corresponding metadata file as "Channel_Chat_Metadata.xml". The metadata file includes a list of all available translated audio files of all the events that has happened in the chat channel along with each audio file mapped to the time on which it has happened on the overall timeline. These audio files is mapped to their corresponding times on a timeline.

Content Presentation

Figure 8:
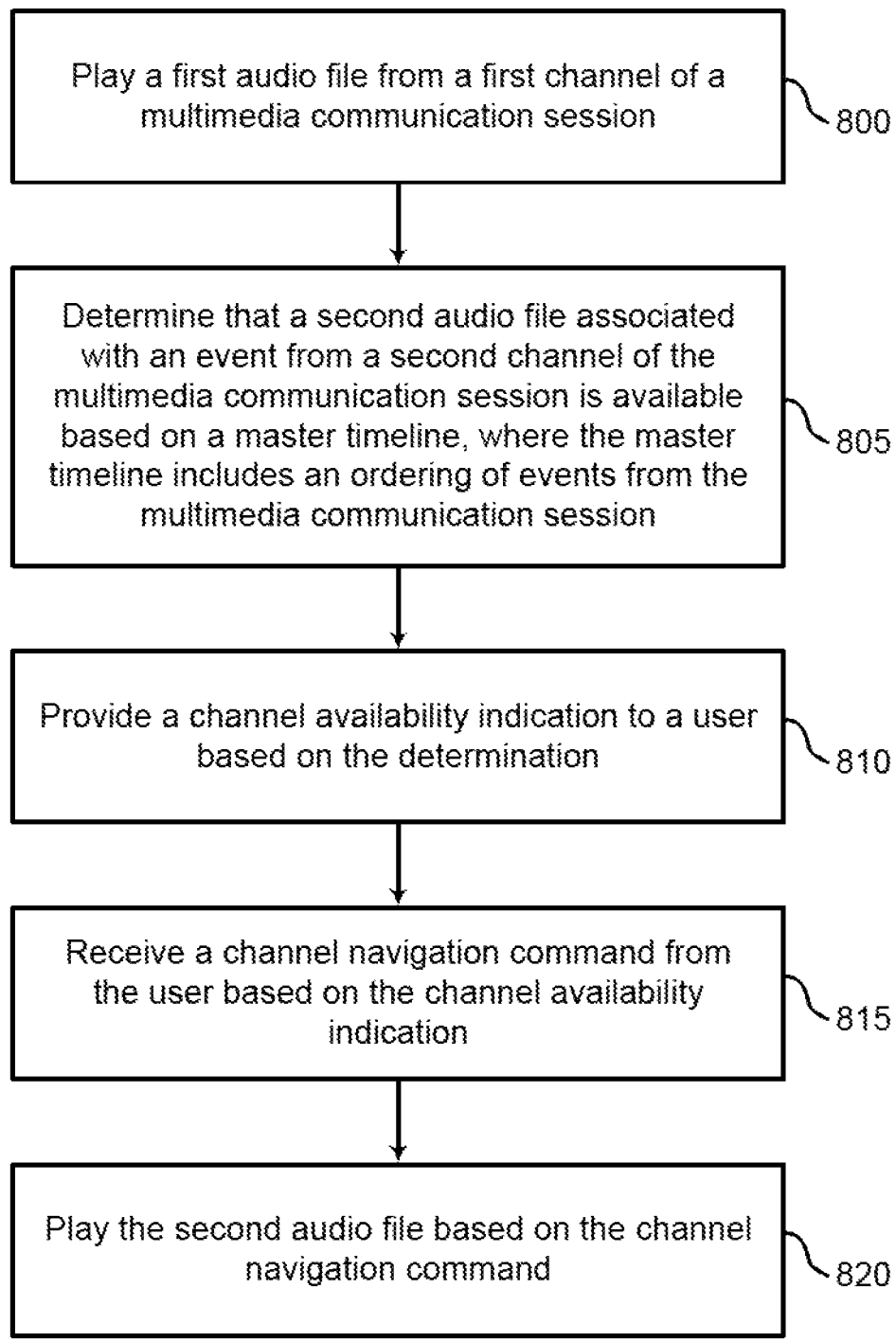
FIG. 8 shows an example of a process for presenting accessible content according to aspects of the present disclosure.

FIG. 8 shows an example of a process for presenting accessible content according to aspects of the present disclosure. In some examples, these operations are performed by a system including a processor executing a set of codes to control functional elements of an apparatus. Additionally or alternatively, the processes are performed using special-purpose hardware. Generally, these operations are performed according to the methods and processes described in accordance with aspects of the present disclosure. In one example, the operations is composed of various substeps, or is performed in conjunction with other operations described herein.

At operation 800, the system plays a first audio file from a first channel of a multimedia communication session. In some cases, the operations of this step refer to, or are performed by, a presentation component as described with reference to FIG. 1.

In an exemplary embodiment of the present invention, an audio experience is provided such that a user 160 can consume content across a plurality of channels. The user 160 consumes audio from the presenter 150, as well as switch between channels to consume translated audio from the visual sections (e.g., slides or polls). The described audio consumption experience includes a custom player with which a user interacts via an audio command interpreter 135 (illustrated in FIG. 1).

In one example, the first channel of the multimedia communication session is a presentation slides channel. Conversion component 120 is configured to convert the presentation slides channel into audio files. In some examples, the conversion component 120 includes a text-to-speech component and/or an image-to-speech component. Hence, the presentation slides channel is converted to audio files explaining the content of the presentation slides in detail.

At operation 805, the system determines that a second audio file associated with an event from a second channel of the multimedia communication session is available based on a master timeline, where the master timeline includes an ordering of events from the multimedia communication session. In some cases, the operations of this step refer to, or are performed by, a presentation component as described with reference to FIG. 1. In one example, the second channel of the multimedia communication session is a polls channel. Conversion component 120 is used to convert the polls channel into audio files.

At operation 810, the system provides a channel availability indication to a user based on the determination. In some cases, the operations of this step refer to, or are performed by, a presentation component as described with reference to FIG. 1.

According to an embodiment of the present disclosure, the presentation component 130 of the server 100 provides a channel availability indication to a user 160 based on the determination. In one example, the second channel is a polls channel. The system sends an availability indication to the user 160 about an event (e.g., a poll conducted) from the second channel.

According to one example, when the user 160 starts listening to the recorded media file through the master player, as soon as the user reaches T2, there is a corresponding first event happens on the presenter's audio channel. The system decides what channel this event is associated with and identify a metadata file of the channel to locate the corresponding audio file with reference to the first event that has happened in the presenter's audio channel.

At operation 815, the system receives a channel navigation command from the user 160 based on the channel availability indication. In some cases, the operations of this step refer to, or are performed by, an audio command interpreter as described with reference to FIG. 1.

According to one example, a visually impaired user chooses to reply to the notifications using predefined commands. The predefined commands includes switching the channel, selecting a new channel as the default, muting a channel, returning to a default channel, not switching the channel but continue to hear notifications from the other channel, or playing both the channels together (i.e., if a channel has background music).

According an embodiment of the present disclosure, the audio command interpreter 135 receives a channel navigation command from the user 160 based on the channel availability indication. In some examples, the channel navigation command includes a verbal command from the user 160 indicating the second channel. Audio command interpreter 135 also receives a resume default command from the user 160. Audio command interpreter 135 is configured to receive audio inputs from the user 160 and identify navigation commands based on the audio inputs.

According to some embodiments of the present disclosure, the player has an audio command interpreter 135 which listens to a user's commands (e.g., verbal commands) and alters the playback behavior based on these commands. In some cases, there is a default channel which can be decided by the author of the recording (in some cases, the author is the presenter 150). A playback scenario starts by running through the timeline of the default channel, and involves audio notifications to the user 160 when certain scenarios occur. The scenarios includes when a new channel starts, when a presenter 150 starts speaking, or when the presenter 150 shares presentation slides. The scenarios also include when an event is encountered on a running channel, for example, a question is asked by a participant, a chat is sent, a replay is posted, etc. Example scenarios further include when a channel ends, for example, the presenter 150 stops speaking, a poll ends, etc.

At operation 820, the system plays the second audio file based on the channel navigation command. In some cases, the operations of this step refer to, or are performed by, a presentation component as described with reference to FIG. 1.

In one example, the second channel (e.g., polls channel) is converted into audio files and the system plays the polls audio file based on the channel navigation command from the user 160. The user 160 has the option to choose to participate in the poll and listen to the content of the poll such as the title and options.

Figure 9:
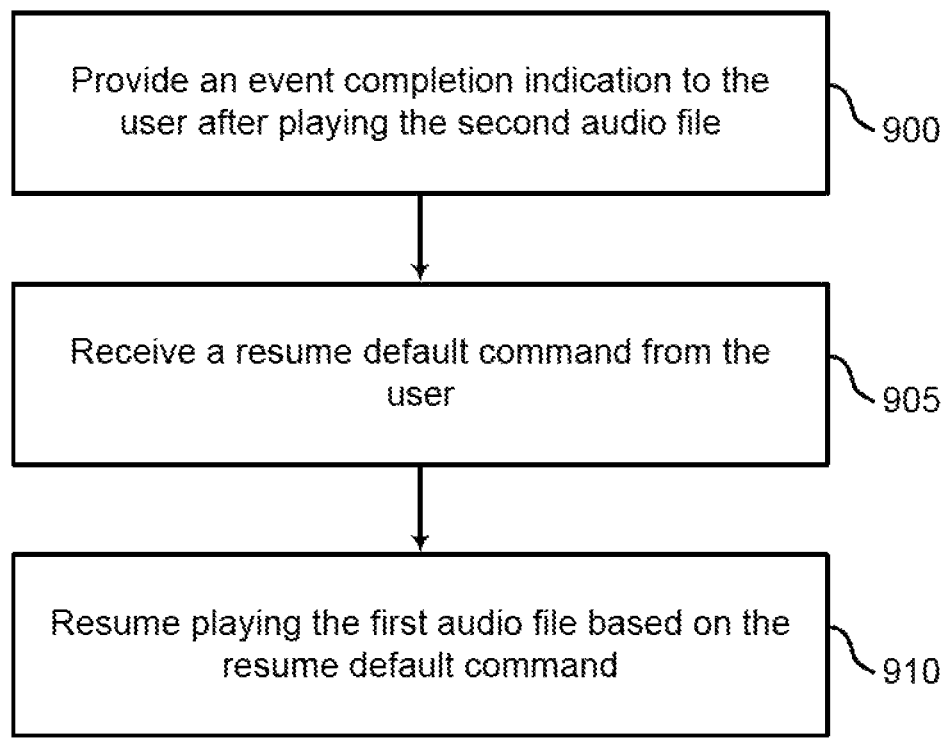
FIGS. 9 and 10 show examples of a process for navigating accessible content according to aspects of the present disclosure.

FIG. 9 shows an example of a process for navigating accessible content according to aspects of the present disclosure. In some examples, these operations are performed by a system including a processor executing a set of codes to control functional elements of an apparatus. Additionally or alternatively, the processes are performed using special-purpose hardware. Generally, these operations are performed according to the methods and processes described in accordance with aspects of the present disclosure. In one example, the operations is composed of various substeps, or is performed in conjunction with other operations described herein.

At operation 900, the system provides an event completion indication to the user after playing the second audio file. In some cases, the operations of this step refer to, or are performed by, a presentation component as described with reference to FIG. 1.

In one example, the second channel is a polls channel, the system plays the polls audio file based on the channel navigation command from the user 160. The user 160 participates in a poll and listen to the content of the poll such as the title and options. After the poll is completed (e.g., the audio file associated with the poll reaches to an end), the system provides an event completion indication to the user.

At operation 905, the system receives a resume default command from the user. In some cases, the operations of this step refer to, or are performed by, an audio command interpreter as described with reference to FIG. 1.

According to an embodiment of the present disclosure, the system includes a navigation module, which provides an audio announcement to the user informing the user about the occurrence of other events on other channels. The navigation module asks for the user's choice and permission if the user needs to switch to a different channel. In some embodiments, the user 160 is provided voice-based number selection.

According to one example, the user 160 says "resume" to continue listening to the present channel (e.g., the first audio file). The system receives the resume default command from the user 160.

At operation 910, the system resumes playing the first audio file based on the resume default command. In some cases, the operations of this step refer to, or are performed by, a presentation component as described with reference to FIG. 1.

Depending on the selection made by the user 160, an audio file of the selected channel event is streamed to the user 160 and the existing audio file from the previous channel pauses. At any time, the user 160 has the option to choose to switch back to any of the events associated with other channels through voice-based selections. In one example, the user 160 says "resume" to continue listening to the present channel (e.g., the first audio file).

Figure 10:
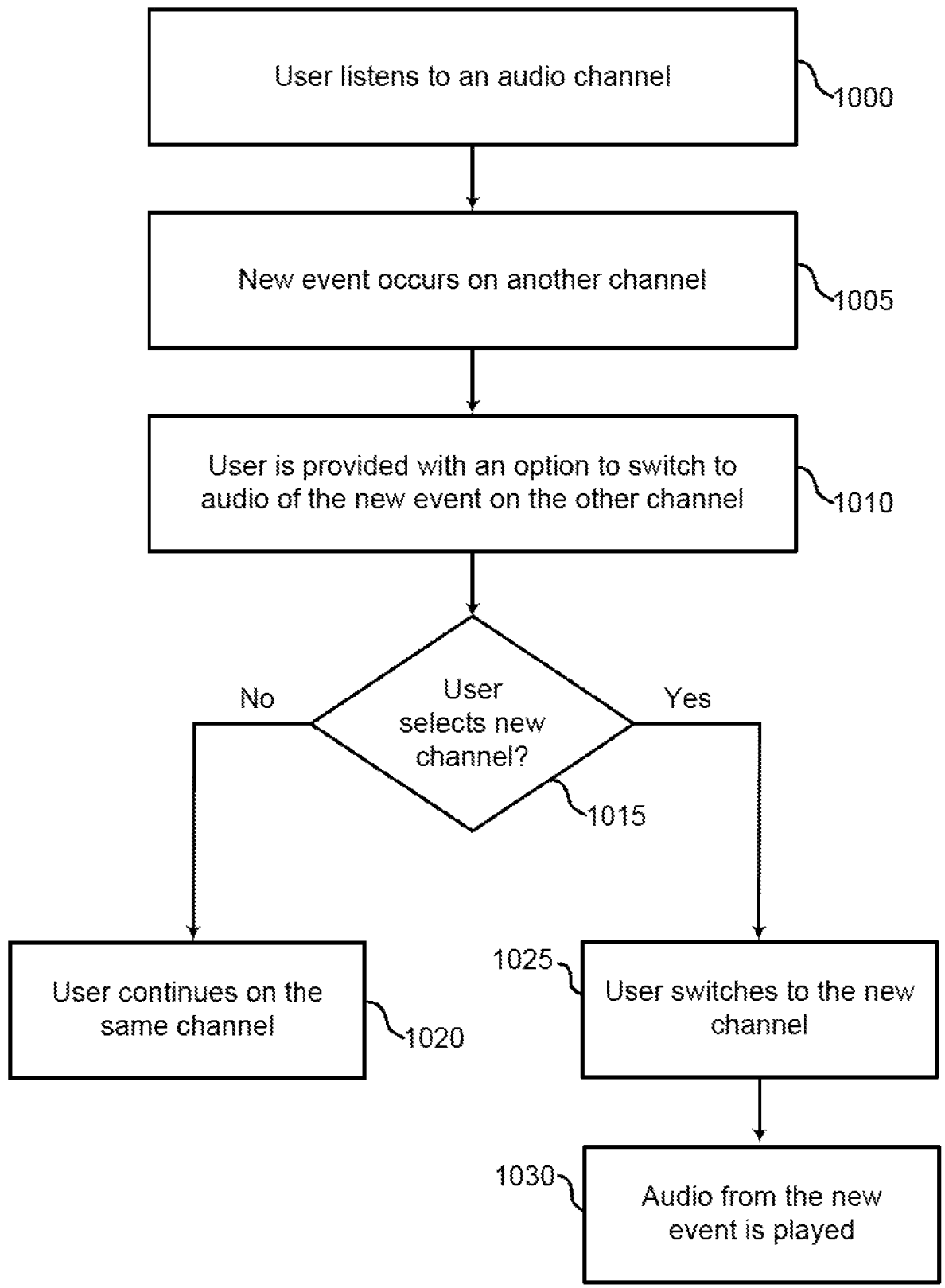

FIG. 10 shows an example of a process for navigating accessible content according to aspects of the present disclosure. In some examples, these operations are performed by a system including a processor executing a set of codes to control functional elements of an apparatus. Additionally or alternatively, the processes are performed using special-purpose hardware. Generally, these operations are performed according to the methods and processes described in accordance with aspects of the present disclosure. In one example, the operations is composed of various substeps, or is performed in conjunction with other operations described herein.

At operation 1000, the user listens to an audio channel. In one example, the user listens to a presentation that includes a main audio channel as a default. At operation 1005, a new event occurs on another channel according to a master timeline of events on the different channels.

At operation 1010, the user is provided with a navigation option (i.e., an audible selection options) to switch to audio of the new event occurring on the other channel. At operation 1015, the user determines whether to switch channels. In one example, the user provides an audible response to the audible navigation prompt.

If the user decides not to switch, at operation 1020, the user continues listening to the original channel. However, if the user decides to switch, at operation 1025, the audio channel is switched to the new channel. Then, at operation 1030, the audio of the new event is played from the other audio channel. In one example, the audio is played from a point in time corresponding to the event in an audio file corresponding to the other channel.

Once the event is complete, or the audio file is complete, the user is prompted with another navigation option to return to the default channel. In some cases, the user is returned to the default channel automatically.

Accordingly, the present disclosure includes the following embodiments.

A method for providing accessible content is described. Embodiments of the method includes identifying a plurality of channels for a multimedia communication session, generating a master timeline for the communication session, wherein the master timeline comprises a chronological ordering of events from each of the channels, and wherein each of the events is associated with event-specific audio data, and presenting the multimedia communication session to a user to enable the user to transition among the channels based on the master timeline.

An apparatus for generating accessible content is described. The apparatus includes a processor, memory in electronic communication with the processor, and instructions stored in the memory. The instructions is operable to cause the processor to identify a plurality of channels for a multimedia communication session, generate a master timeline for the communication session, wherein the master timeline comprises a chronological ordering of events from each of the channels, and wherein each of the events is associated with event-specific audio data, and present the multimedia communication session to a user to enable the user to transition among the channels based on the master timeline.

A non-transitory computer readable medium storing code for generating accessible content is described. In some examples, the code comprises instructions executable by a processor to: identify a plurality of channels for a multimedia communication session, generate a master timeline for the communication session, wherein the master timeline comprises a chronological ordering of events from each of the channels, and wherein each of the events is associated with event-specific audio data, and present the multimedia communication session to a user to enable the user to transition among the channels based on the master timeline.

Some examples of the method, apparatus, and non-transitory computer readable medium described above further include identifying the events from each of the plurality of channels. Some examples further include generating event data for each of the events, wherein the event data includes the event-specific audio data and a start time of the event. Some examples further include generating channel metadata for each of the channels based on the event data, wherein the master timeline is generated based on the channel metadata. In some examples, the event data further includes at least one of an event ID, an event name, and an event duration.

Some examples of the method, apparatus, and non-transitory computer readable medium described above further include converting visual data from one or more of the channels to the event-specific audio data. In some examples, the conversion of the visual data comprises a text-to-speech conversion.

Some examples of the method, apparatus, and non-transitory computer readable medium described above further include playing a first audio file associated with a default channel of the plurality of channels. Some examples further include identifying an event from a secondary channel from the plurality of channels based on the master timeline, wherein the event is associated with a current time of the first audio file. Some examples further include providing a channel availability indication to the user. Some examples further include receiving a channel navigation command from the user. Some examples further include playing a second audio file associated with the event.

In some examples, the channels include at least two of a foreground audio channel, a background audio channel, a slide presentation channel, a chat channel, and a polls channel. In some examples, the channels include at least two simultaneous channels. In some examples, the channels include at least one audio channel and at least one non-audio channel.

A method for providing accessible content is described. Embodiments of the method includes playing a first audio file from a first channel of a multimedia communication session, determining that a second audio file associated with an event from a second channel of the multimedia communication session is available based on a master timeline, wherein the master timeline comprises an ordering of events from the multimedia communication session, providing a channel availability indication to a user based on the determination, receiving a channel navigation command from the user based on the channel availability indication, and playing the second audio file based on the channel navigation command.

An apparatus for generating accessible content is described. The apparatus includes a processor, memory in electronic communication with the processor, and instructions stored in the memory. The instructions is operable to cause the processor to play a first audio file from a first channel of a multimedia communication session, determine that a second audio file associated with an event from a second channel of the multimedia communication session is available based on a master timeline, wherein the master timeline comprises an ordering of events from the multimedia communication session, provide a channel availability indication to a user based on the determination, receive a channel navigation command from the user based on the channel availability indication, and play the second audio file based on the channel navigation command.

A non-transitory computer readable medium storing code for generating accessible content is described. In some examples, the code comprises instructions executable by a processor to: play a first audio file from a first channel of a multimedia communication session, determine that a second audio file associated with an event from a second channel of the multimedia communication session is available based on a master timeline, wherein the master timeline comprises an ordering of events from the multimedia communication session, provide a channel availability indication to a user based on the determination, receive a channel navigation command from the user based on the channel availability indication, and play the second audio file based on the channel navigation command.

In some examples, the channel availability indication comprises a verbal description of available navigation options including the second channel. In some examples, the channel navigation command comprises a verbal command from the user indicating the second channel.

Some examples of the method, apparatus, and non-transitory computer readable medium described above further include providing an event completion indication to the user after playing the second audio file. Some examples further include receiving a resume default command from the user. Some examples further include resuming playing the first audio file based on the resume default command.

Some examples of the method, apparatus, and non-transitory computer readable medium described above further include determining a time for resuming the first audio file based on a user configuration, wherein the time for resuming the first audio file comprises a stopping time of the first audio file or a time associated with an end of the second audio file. Some examples of the method, apparatus, and non-transitory computer readable medium described above further include determining that the second audio file comprises a background audio file, wherein the second audio file is played simultaneously with the first audio file.

An apparatus for providing accessible content is described. Embodiments of the apparatus includes a recording component configured to record a plurality of channels for a multimedia communication session, a conversion component configured to convert non-audio channels of the multimedia communication session into audio files, and a timeline generation component configured to generate a master timeline for the communication session, wherein the master timeline comprises a chronological ordering of events from each of the channels.

A method of manufacturing an apparatus for providing accessible content is described. The method includes providing a recording component configured to record a plurality of channels for a multimedia communication session, providing a conversion component configured to convert non-audio channels of the multimedia communication session into audio files, and providing a timeline generation component configured to generate a master timeline for the communication session, wherein the master timeline comprises a chronological ordering of events from each of the channels.

Some examples of the apparatus and method described above further include a presentation component configured to present the multimedia communication session to a user to enable the user to transition among the channels based on the master timeline. Some examples of the apparatus and method described above further include an audio command interpreter configured to receive audio inputs from a user and identify navigation commands based on the audio inputs.

In some examples, the conversion component comprises a text-to-speech component. In some other examples, the conversion component comprises an image-to-speech component.

The description and drawings described herein represent example configurations and do not represent all the implementations within the scope of the claims. In one example, the operations and steps is rearranged, combined, or otherwise modified. Also, structures and devices is represented in the form of block diagrams to represent the relationship between components and avoid obscuring the described concepts. Similar components or features has the same name but has different reference numbers corresponding to different figures.

Some modifications to the disclosure is readily apparent to those skilled in the art, and the principles defined herein is applied to other variations without departing from the scope of the disclosure. Thus, the disclosure is not limited to the examples and designs described herein, but is to be accorded the broadest scope consistent with the principles and novel features disclosed herein.

The described methods is implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor is a microprocessor, a conventional processor, controller, microcontroller, or state machine. In one example, a processor is implemented as a combination of computing devices (e.g., a combination of a DSP and a microprocessor, multiple microprocessors, one or more microprocessors in conjunction with a DSP core, or any other such configuration). Thus, the functions described herein is implemented in hardware or software and is executed by a processor, firmware, or any combination thereof. If implemented in software executed by a processor, the functions is stored in the form of instructions or code on a computer-readable medium.

Computer-readable media includes both non-transitory computer storage media and communication media including any medium that facilitates transfer of code or data. A non-transitory storage medium is any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components is properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" is based on both condition A and condition B. In other words, the phrase "based on" shall be construed to mean "based at least in part on." Also, the words "a" or "an" indicate "at least one."

What is claimed is:

1. A method for generating accessible content, comprising:
    recording a plurality of channels of a multimedia communication session wherein the plurality of channels includes a first channel and a second channel, the first channel comprising a first event having a first start time, and the second channel comprising a second event that overlaps the first event and that has a second start time different from the first start time;
    generating a master timeline for the communication session, wherein the master timeline comprises a chronological ordering of events from each of the channels including the first event and the second event, and wherein each of the events is associated with event-specific audio data;
    presenting the multimedia communication session to a user to enable the user to transition among the channels based on the master timeline;
    playing a first audio file associated with the first channel;
    identifying the second event from the second channel based on the second start time and the master timeline, wherein the second start time is associated with a current time of the first audio file;
    providing a channel availability indication to the user based on the second event, wherein the channel availability indication includes a description of the second channel;
    receiving a channel navigation command from the user in response to the channel availability indication; and
    playing a second audio file associated with the second event, wherein the second audio file is associated with the second channel.

2. The method of claim 1, further comprising:
    identifying the events from each of the plurality of channels;
    generating event data for each of the events, wherein the event data includes the event-specific audio data and a start time of the event; and
    generating channel metadata for each of the channels based on the event data, wherein the master timeline is generated based on the channel metadata.

3. The method of claim 2, wherein:
    the event data further includes at least one of an event ID, an event name, and an event duration.

4. The method of claim 1, further comprising:
converting visual data from one or more of the channels to the event-specific audio data.

5. The method of claim 4, wherein:
the conversion of the visual data comprises a text-to-speech conversion.

6. The method of claim 1, wherein:
the channels include at least two of a foreground audio channel, a background audio channel, a slide presentation channel, a chat channel, and a polls channel.

7. The method of claim 1, wherein:
the channels include at least two simultaneous channels.

8. The method of claim 1, wherein:
the channels include at least one audio channel and at least one non-audio channel.

9. A method of presenting accessible content, the method comprising:
playing a first audio file from a first channel of a multimedia communication session, the multimedia communication session including a plurality of channels;
determining that a second audio file associated with an event from a second channel of the plurality of channels is available based on a master timeline, wherein the master timeline comprises an ordering of events from the multimedia communication session, and wherein the event is associated with a current time of the first audio file;
providing a channel availability indication to a user based on the determination, wherein the channel availability indication includes a description of the second channel;
receiving a channel navigation command from the user based on the channel availability indication;
determining that the second audio file comprises a background audio file; and
playing the second audio file based on the channel navigation command, wherein the second audio file is associated with the second channel and is played simultaneously with the first audio file.

10. The method of claim 9, wherein:
the channel availability indication comprises a verbal description of available navigation options including the second channel.

11. The method of claim 9, wherein:
the channel navigation command comprises a verbal command from the user indicating the second channel.

12. The method of claim 9, further comprising:
providing an event completion indication to the user after playing the second audio file;
receiving a resume default command from the user; and
resuming playing the first audio file based on the resume default command.

13. The method of claim 12, further comprising:
determining a time for resuming the first audio file based on a user configuration, wherein the time for resuming the first audio file comprises a stopping time of the first audio file or a time associated with an end of the second audio file.

14. An apparatus for generating accessible content, comprising:
a recording component configured to record a plurality of channels for a multimedia communication session, wherein the plurality of channels includes a first channel and a second channel, the first channel comprising a first event having a first start time, and the second channel comprising a second event that overlaps the first event and that has a second start time different from the first start time;
a conversion component configured to convert non-audio channels of the multimedia communication session into audio files; and
a timeline generation component configured to generate a master timeline for the communication session, wherein the master timeline comprises a chronological ordering of events from each of the channels including the first event and the second event, and wherein each event is associated with event-specific audio data.

15. The apparatus of claim 14, further comprising:
a presentation component configured to present the multimedia communication session to a user to enable the user to transition among the channels based on the master timeline.

16. The apparatus of claim 14, further comprising:
an audio command interpreter configured to receive audio inputs from a user and identify navigation commands based on the audio inputs.

17. The apparatus of claim 14, wherein:
the conversion component comprises a text-to-speech component.

18. The apparatus of claim 14, wherein:
the conversion component comprises an image-to-speech component.

* * * * *